United States Patent Office 3,644,314
Patented Feb. 22, 1972

3,644,314
PREPARATION OF COPOLYMERS USING ORGANOLITHIUM/PYRIDINE COMPOUND CATALYST SYSTEM
Akira Onishi, Shiro Anzai, Koichi Irako, Ryota Fujio, Yoshihiro Hayakawa, Minoru Kojima, and Hiroshi Kawamoto, Tokyo, Japan, assignors to Bridgestone Tire Company Limited, Tokyo, Japan
No Drawing. Filed Dec. 13, 1968, Ser. No. 783,705
Claims priority, application Japan, Dec. 22, 1967, 42/81,899
Int. Cl. C08f 1/28, 1/76, 15/04
U.S. Cl. 260—84.7    17 Claims

ABSTRACT OF THE DISCLOSURE

Random copolymer is prepared by copolymerizing a conjugated diene, such as 1,3-butadiene and a vinyl-substituted aromatic hydrocarbon, such as styrene at a temperature of −80° to 150° C. in the presence of a substantially anhydrous liquid hydrocarbon by means of a catalyst system consisting essentially of an organolithium compound and a pyridine compound having the formula

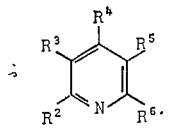

wherein $R^2$, $R^3$, $R^4$, $R^5$ and $R^6$ is selected from the group consisting of hydrogen and hydrocarbon radicals and at least two of them are hydrocarbon radicals selected from the group consisting of alkyl, alkenyl, cycloalkyl and aralkyl radicals.

---

The present invention relates to a method of producing conjugated diene polymers by means of a novel catalyst system and more particularly, a method of producing random copolymers of a conjugated diene and a vinyl-substituted aromatic hydrocarbon by contacting a mixture of a conjugated diene and a vinyl-substituted aromatic hydrocarbon with two component catalysts consisting of an organolithium compound and a multihydrocarbon radical-substituted pyridine.

When a mixture of a conjugated diene and a vinyl-substituted aromatic hydrocarbon, for example, a mixture of 1,3-butadiene and styrene is copolymerized by means of an organolithium compound in a hydrocarbon solvent, the reactivities of both monomers are considerably different and as the copolymerization proceeds, 1,3-butadiene having a higher reactivity in the copolymerization is firstly consumed, and then styrene having poorer reactivity is mainly polymerized to produce a block copolymer having a localized distribution of sequences. However, the block copolymer has been used for a special application due to the physical property resulting from the structure, but is not preferable as polymer for producing tire. Therefore, as such a polymer, for example, a random copolymer of 1,3-butadiene and styrene is demanded.

So-called "random copolymers" mean copolymers wherein vinyl-substituted aromatic hydrocarbon unit is distributed more uniformly throughout the polymer chain than the above described block copolymers obtained by using organolithium compound in a hydrocarbon solvent.

For producing such copolymers, various attempts have been heretofore made in the copolymerization of conjugated diene and a vinyl-substituted aromatic hydrocarbon. The typical process is disclosed in U.S. Pat. No. 2,975,160, in which the copolymerization is effected in the presence of various randomizers, such as ether compounds, thioether compounds or tertiary amine compounds. This process is referred to as "process A" hereinafter. On the other hand, according to the method of the present invention, a catalyst consisting of an organolithium compound and a multihydrocarbon radical-substituted pyridine compound, wherein hydrogens in pyridine ring are substituted with two or more hydrocarbon radicals, is used as a catalyst for producing random copolymers.

The process A discloses that a conjugated diene, such as butadiene, isoprene, etc. and other unsaturated compounds, such as styrene are copolymerized in the presence of paraffin, cycloparaffin or aromatic hydrocarbon and a polar compound which does not deactivate organolithium compound to be used as the catalyst. Such a polar compound includes ethers, thioethers and tertiary amines as described above and the particular examples of the tertiary amines are dimethylethylamine, tri-n-propylamine, tri-n-butylamine, trimethylamine, triethylamine, N,N-dimethylamine, pyridine, quinoline, N-ethyl-piperidine, N-ethyl-N-methylaniline. These compounds can be roughly classified into trialkylamines, such as triethylamine, etc., dialkylmonoarylamines, such as N,N - dimethylaniline, etc., nitrogen-containing heterocyclic compounds, such as N-alkyl-piperidines, such as N-ethyl-piperidine, etc., pyridine and quinoline.

In the copolymerization of a conjugated diene and a vinyl-substituted aromatic hydrocarbon by using an organolithium compound as a catalyst, even if trialkylamines, dialkylmonoaryl amines and N-alkyl-piperidines are used in such a large amount that they are used as a solvent, they do not affect the copolymerization adversely, while when using pyridine or quinoline, if such a compound is used in an amount of more than 0.5 mole/mole of organolithium compound, the copolymerization is retarded considerably and particularly, if such a compound is used in an amount of more than 1 mole/mole of organolithium compound, the copolymerization is entirely retarded. Namely, this shows that pyridine or quinoline deactivates the organolithium compound. It has been well known that the organolithium compound and pyridine or quinoline form an addition product and it is considered that the above described deactivating phenomenon is based on the fact that this addition product has no function for initiating polymerization. In this case, the copolymerization occurs, when pyridine or quinoline is used in an amount of less than 0.5 mole/mole of organolithium compound, but the activity lowers as compared with the case when such a compound is not added to the catalyst, and the resulting copolymer is block copolymer. Various nitrogen - containing heterocyclic compounds, such as pyridine, quinoxaline, $\alpha,\alpha'$-dipyridine, 1,3-(di-p-pyridyl) propane, phenadine, etc. retard polymerization as pyridine and quinoline. In other words, in the copolymerization of a conjugated diene and a vinyl-substituted aromatic hydrocarbon disclosed in the process A, it is apparently shown that the nitrogen-containing heterocyclic compounds exemplified by pyridine and quinoline are entirely different from the other tertiary amine, such as trialkyl amines and have a particular behavior that retards the random copolymerization of a vinyl-substituted aromatic hydrocarbon and it can be presumed that they are solvent components having an undesirable function for retardation of the polymerization.

However, unexpectedly, it has been found that a catalyst system combined a multihydrocarbon radical-substituted pyridine, in which hydrogen of pyridine rings are substituted with two or more hydrocarbon radicals, and an organolithium compound shows an excellent polymerization activity in the copolymerization of a conjugated diene and a vinyl-substituted aromatic hydrocarbon, even when the catalyst system composed of pyridine and an organolithium compound does not cause the polymerization. Further, surprisingly, this catalyst system can provide copolymers having a sufficient randomness by using a combination of multihydrocarbon radical-substituted pyridine of an extremely smaller amount than various tertiary amines, such as trialkyl amines, dialkyl-monoaryl amines, N-alkyl piperidines, etc. with an organolithium compound. More correctly speaking, these pyridines are sufficient in use of equivalent to an organolithium compound. It is a very excellent merit in view of economy that the object can be attained by such a small amount. Furthermore, the multihydrocarbon radical-substituted pyridines have generally a high boiling point of higher than 140° C. and usually they are used only in a catalytic amount, so that when recovering solvent, it is very easy to prevent contamination of the solvent and consequently, it is not necessary to effect a complicated purification of the solvent. Moreover, since the multihydrocarbon radical-substituted pyridines are Brönsted bases, if necessary, they can be removed completely from the solvent system by washing with water containing an acid and this point is a particular merit of the nitrogen-containing base as compared with ethers or thioethers.

According to the method of the present invention, it is possible to control, for example, the content of vinyl structure of the resulting 1,3-butadiene copolymers within a range of 15 to 50%. Particularly, it is possible to select the vinyl content within a range of 25 to 40% without affecting the randomness of the copolymer adversely and this point is a merit as compared with the process disclosed in French Pat. No. 1,425,276 (process B). In the process B, the copolymerization is effected by using a catalyst composed of an organolithium compound and a chelate forming difunctional Lewis base, such as tetramethylethylene diamine and in this case, the content of vinyl structure in the butadiene unit of the copolymer composed of butadiene as one component is generally extremely higher than 60% and such a large amount of vinyl content increases glass transition temperature of the polymer considerably and therefore, the properties as elastomer material are deteriorated.

According to the present invention, the stability of the catalyst is excellent in a polymerization temperature from a low temperature to a high temperature and the catalyst is not deactivated until the polymerization is completed. The catalyst system prepared by previously aging the two components, a reaction system wherein to such an aged catalyst are added monomers or a reaction system wherein to monomers and solvent are added two components of the catalyst, is completely homogeneous and therefore the operation is easy, the reproducibility is excellent and the separation of the catalyst from the copolymer can be readily effected.

In order to make the characteristics of the present invention more clear, various typical multihydrocarbon radical-substituted pyridines are exemplified and their effects and merits will be explained.

First, there is a possibility that dimethylpyridines, that is, lutidines, are available very cheaply in a mixture of each isomer, because dimethylpyridines are contained in a fair amount in pyridine base components contained in coal tar obtained by dry distillation of coals, while the known tertiary amines must be obtained by synthetic process.

Second, among multialkyl radical-substituted pyridines, particularly, trimethyl pyridines, such as, 2,4,6-collidine, 2,3,6-collidine, etc. act as an excellent activator for organolithium compound and, for example, the use of a catalytic amount provides polymerization activity of several times N-butyllithium single component catalyst and it is possible to control easily, for example, the vinyl content in butadiene unit within a range of 25 to 35% without substantially loosing the randomness of the copolymer. Furthermore, even though the above described trimethyl-pyridines cannot be obtained in such a cheap cost as in the lutidines, they can be easily obtained in a comparatively cheap cost and further as mentioned above, many of the tertiary amines should be used in such a large amount that they are used for solvent, in order to obtain random copolymer, while only multihydrocarbon radical-substituted pyridines can attain the object in use of a catalytic amount and trimethylpyridines is also available similarly. Accordingly, trimethylpyridines belong to the most advantageous second component in view of the polymerization velocity, economy and configuration of polymer.

Third, by using dialkyl-substituted pyridines, wherein hydrogens of 3- and 4- position of the pyridine ring are substituted with alkyl groups, such as β-collidine, 3,4-lutidine, as a randomizer, it is possible to obtain easily copolymers, wherein vinyl-substituted aromatic hydrocarbon is distributed substantially uniformly throughout the copolymer chain. Furthermore, in this case the vinyl content in the conjugated diene unit of the copolymer does not exceed 50% and usually is less than 45%.

Fourth, pentaalkylpyridines show noticeable activating effect under particular conditions as shown in examples.

The above explanation of the typical examples relates to only a part of numerous multihydrocarbon radical-substituted pyridines and by such an explanation the effects and merits of the multihydrocarbon radical-substituted pyridines are not fully described.

In short, the process for producing the polymer of the present invention consists in that a mixture of a conjugated diene and a vinyl-substituted aromatic hydrocarbon is contacted with two component catalyst consisting of (1) an organolithium compound and (2) a multihydrocarbon radical-substituted pyridine in the reaction zone, usually in a liquid solvent at an appropriate temperature under an appropriate pressure.

The monomers to be used in the polymerization process of the present invention are a mixture of a conjugated diene having 4 to 12 carbon atoms and a vinyl-substituted aromatic hydrocarbon.

The conjugated dienes having 4 to 12 carbon atoms include, for example, 1,3-butadiene, isoprene, piperylene, 2,3-dimethyl-1,3-butadiene, 1,3-hexadiene and the like. Particularly, 1,3-butadiene and isoprene are most preferable.

The vinyl-substituted aromatic hydrocarbons are compounds, wherein at least one vinyl group is attached to carbon atom of aromatic nucleus, and include styrene, 1-vinylnaphthalene, 3-vinyltoluene, divinylbenzene, etc. Among them styrene is most preferable. As the other examples, mention may be made of 3,5-diethylstyrene, 4-n-propylstyrene, 2,4,6-trimethylstyrene, 4-phenylstyrene, 4-p-tolylstyrene, 3,5-diphenylstyrene, 3-ethyl-1-vinylnaphthalene, 8-phenyl-1-vinylnaphthalene and the like.

The organolithium compound to be used as the first component of the catalyst according to the present invention can be shown by the following formula:

In the formula, $x$ is an integer of 1 to 4 and $R^1$ is aliphatic, cycloaliphatic, or aromatic hydrocarbon radicals and also high molecular weight hydrocarbon radicals are included in the scope of the present invention. As $R^1$, hydrocarbon radicals having 1 to 40 carbon atoms are preferable.

The lithium compounds when $x$ is 1 is preferable. When $x$ is 1, the preferable $R^1$ is alkyl, alkenyl, cycloalkyl, aryl, alkaryl or aralkyl, etc., for example, methyl, ethyl, n-propyl, isopropyl, n-butyl, isobutyl, sec-butyl, tert-butyl, n-amyl, isoamyl, n-hexyl, 2-ethylhexyl, n-octyl, n-decyl, stearyl, etc.; allyl, n-propenyl, isobutenyl, etc.; 1-cyclohexenyl, cyclopentyl, cyclohexyl, cyclohexylethyl, etc.; phenyl, naphthyl, etc.; tolyl, butylphenyl, ethylnaphthyl, etc.; benzyl, phenylbutyl, etc.

As the first component of the catalyst, alkyllithium compounds, the alkyl group of which has 2 to 8 carbon atoms, are preferable and among them n-butyllithium is most preferable. The lithium compounds when $x$ is 2 to 4, include, for example, tetramethylenedilithium, pentamethylenedilithium, hexamethylenedilithium, diphenylethylenedilithium, 1,5 - dilithiumnaphthalene, 1,20 - dilithioeicosane, 1,4 - dilithiocyclohexane, etc. Furthermore, the organolithium compounds containing functional group inert to the polymerization can also be used.

Furthermore, the organolithium compounds containing hydrocarbon radicals having more than 41 carbon atoms are included in the organolithium compounds according to the present invention having the general formula $R^1(Li)_x$ but the preferable lithium compounds are those which one end or both ends of lower molecular or high molecular weight linear polymers are bonded with lithium. Among them, polystyrylmonolithium, polybutadienylmonolithium, polyisoprenylmonolithium, polystyryldilithium, polybutadienyldilithium, polyisoprenyldilithium or such lithium compounds that one end or both ends of linear copolymers of styrene and butadiene are bonded with lithium, are particularly preferable.

As the second component of the catalyst of the present invention, multihydrocarbon radical-substituted pyridines having the general formula:

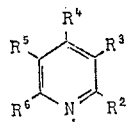

wherein $R^2$, $R^3$, $R^4$, $R^5$ and $R^6$ are hydrogen or same or different hydrocarbon radicals, provided that at least two of $R^2$, $R^3$, $R^4$, $R^5$ and $R^6$ are hydrocarbon radicals, are used. The preferable $R^2$, $R^3$, $R^4$, $R^5$ and $R^6$ include hydrogen, alkyl, alkenyl, cycloalkyl, or aralkyl groups and as the hydrocarbon radicals, alkyl groups having 1 to 20 carbon atoms are preferable and particularly, alkyl groups having 1 to 5 carbon atoms are preferable. Examples of the hydrocarbon radicals are methyl, ethyl, n-propyl, isopropyl, n-butyl, isobutyl, tert-butyl, n-amyl, etc.; n-propenyl, etc.; cyclopentyl, cyclohexyl, cyclohexylethyl, etc.; benzyl, phenylethyl, etc. Among them, the preferable multialkyl radical-substituted pyridines are as follows:

(a) Three among $R^2$, $R^3$, $R^4$, $R^5$ and $R^6$ are hydrogen and the other two are methyl or ethyl radical.

(b) Two among $R^2$, $R^3$, $R^4$, $R^5$ and $R^6$ are hydrogen and the other three are methyl or ethyl radical.

(c) One among $R^2$, $R^3$, $R^4$, $R^5$ and $R^6$ is hydrogen and the other four are methyl or ethyl radical.

(d) All of $R^2$, $R^3$, $R^4$, $R^5$ and $R^6$ are methyl or ethyl radical. Furthermore, these multihydrocarbon radical-substituted pyridines may be used in a mixture of two or more compounds. Particularly preferable multialkyl radical-substituted pyridines are as follows according to the above described classification.

As group (a), mention may be made of 2,3-lutidine, 2,4-lutidine, 2,5-lutidine, 2,6-lutidine, 3,4-lutidine, 3,5-lutdine, aldehydecollidine, β-collidine, 3 - methyl - 5 - ethylpyridine, 3,4-diethylpyridine, 3,5-diethylpyridine, etc.

As group (b), mention may be made of 2,3,4-collidine, 2,3,5 - collidine, 2,3,6 - collidine, 2,4,5 - collidine, 2,4,6-collidine, 3,4,5-collidine, 3,4,5-triethylpyridine, etc.

As group (c), mention may be made of 2,3,4,5-tetramethylpyridine, 2,3,4,6-tetramethylpyridine, 2,3,5,6-tetramethylpyridine, mixtures of two or more compounds among the above three compounds, etc.

As group (d), mention may be made of pentamethyl pyridine, etc.

As mixture of groups (a) and (b), mixture of two or more compounds selected from six kinds of lutidines and six kinds of trimethylpyridines are preferable. In these mixtures, various fractions containing multialkyl radical-substituted pyridines obtained by fractional distillation of coal tar and bone tar are included. Among these multialkyl radical-substituted pyridines, 3,4-lutidine, β-collidine, 2,4,6-collidine, 2,3,6-collidine, or mixtures of two or more compounds selected from six kinds of lutidines and six kinds of trimethylpyridines are particularly preferable.

Those which α-, β-, or γ-position is substituted with only one hydrocarbon, such as α, β- or γ-picoline, etc. have little effect, so that they are excluded from the present invention.

It has been well known that when the organolithium compound of the first component of the catalyst system of the present invention is used alone, the polymerization velocity increases and the molecular weight of the copolymer decreases, as the amount of the organolithium compound increases. In the catalyst system of the present invention, in which the second catalyst component is added to the organolithium compound, this tendency is not lost and consequently, the amount is varied within a wide range depending upon the polymerization object and the polymerization process and in general, the amount ranges within 0.01–100 mmole per mole of the total monomer, but when a high molecular weight polymer and a high activity are desired, the amount of organolithium compound is 0.01 to 10 mmole per mole of the total monomers.

According to the present invention, the catalyst is formed by mixing at least one organolithium compound and at least one multihydrocarbon radical-substituted pyridine.

Mole ratio of multihydrocarbon radical-substituted pyridine/organolithium compound can vary depending upon the kind of catalyst components and the content of impurity in said components, but the preferable mole ratio which can activate the organolithium compound and provide random copolymers, is as follows.

(A) In the case of such pyridine derivatives that three hydrogens in the pyridine ring are substituted with hydrocarbon radicals or a mixture consisting mainly of these pyridines, said mole ratio is 0.5 to 10.0, preferably, 0.7 to 5.0.

(B) In the case of such pyridine derivatives that two, four or five hydrogens in the pyridine ring are substituted with hydrocarbon radicals or a mixture consisting mainly of these pyridines, said mole ratio is 0.5 to 5.0, preferably 0.7 to 3.0.

It is possible by varying the mole ratio to vary the content of vinyl structure in butadiene unit and randomness of the copolymer, while maintaining the high activity.

The polymerization process of the present invention may be effected by a bulk polymerization, but in general, a solution polymerization in an inert medium is preferable. Such reaction medium consists of substantially anhydrous liquid hydrocarbon having less than 20 carbon atoms, preferably, from 4 to 10 carbon atoms. The medium involves aliphatic, cycloaliphatic or aromatic hydrocarbons such as, propane, butane, pentane, hexane, heptane, isooctane, cyclopentane, cyclohexane, decane, hexadecane, benzene, toluene, ethylbenzene, xylenes, naphthalene, tetrahydronaphthalene, etc.

In order to obtain more complete random copolymer, aliphatic or alicyclic hydrocarbons are somewhat preferable. Of course, these solvents may be used in a mixture of two or more solvents. An amount of solvent to be used in copolymerization is determined according to the desired molecular weight of the copolymer, the kind of solvent and the like, but the amount ranges usually 100 to 2,000 parts by weight based on 100 parts by weight of the monomers, preferably, 300 to 1,000 parts by weight and if necessary, the solvent may be supplemented during the polymerization reaction to maintain the reaction system in a proper viscosity.

In general, it is preferable to remove water, oxygen, carbon dioxide and other catalyst poisons from all substances concerning the polymerization step, such as, catalyst components, solvent, monomers and the like and it is preferable to effect the polymerization reaction in an inert gaseous atmosphere, such as, dried nitrogen or argon.

The process of the present invention can be carried out either in a batch system or a continuous system by using a proper process for adding the starting materials. Various addition processes can be effected. Namely, the first and second components of the catalyst, solvent and monomers may be introduced simultaneously into a reactor or the two catalyst components may be added separately before or after solvent and monomers are charged. Alternatively, the previously aged and prepared catalyst may be added to a mixture of solvent and monomers. The multihydrocarbon radical-substituted pyridines of the second component of the catalyst are sufficient in a very small amount and they form an effective catalyst with the organolithium compound rapidly even in a fairly diluted state, so that a time necessary for forming the catalyst is short. The multihydrocarbon radical-substituted pyridine are usual liquid, therefore, they can be easily used as such, but it is possible to use such pyridines by dissolving in a liquid solvent for the polymerization, liquid monomers or the mixture thereof. Furthermore, it is involved in the present invention that the two components of the catalyst are previously mixed and aged in a liquid hydrocarbon, preferably, a solvent to be used for the polymerization.

In the preparation of the catalyst, it is preferable to avoid a severe treatment and to use a mild aging condition. However, as seen from the fact that the catalyst shows a surprising activity even in a polymerization at a high temperature, the two component catalyst after they are contacted with monomers is not deactivated under a severe condition.

This process can carry out the polymerization continuously by maintaining the concentration of reactants in the reactor properly for an appropriate resident time by the above described various addition processes. The polymerization time in a batch system is not particularly limited, but even if the amount of catalyst is very small the polymerization is substantially completed within 24 hours. In a continuous system, the resident time varies widely according to the condition, but it is generally from several minutes to about 2 hours under a condition of particular range.

According to the present invention, the copolymerization can be effected at a temperature within a range of −80 to 150° C., but in general it is preferable to effect the copolymerization within a range of 0 to 100° C. Moreover, it is within the scope of the present invention that in a batch system the temperature is raised continuously or in a multi-stage and that in a continuous system the temperature is raised at the terminal stage of copolymerization. The polymerization reaction can be effected under a pressure generated autogeneously, but usually it is preferable to effect the polymerization under a sufficient pressure to retain the monomers in a substantially liquid state.

In general, the pressure depends upon monomers to be copolymerized, solvent, polymerization temperature and the like.

After the polymerization is completed or a desired molecular weight is attained, it is possible to recover the copolymer by effecting usual operations for preventing oxidation, deactivating the catalyst, separating and recovering the copolymer and the like. Namely, the polymerization solution is added with an antioxidant and then added with a non-solvent, such as, methyl alcohol, isopropyl alcohol, water, etc., whereby the catalyst can be deactivated and the copolymer can be recovered. Alternatively, the polymerization solution added with an antioxidant is poured into a heated non-solvent to distill off the solvent or in some case, to distill off a mixture of the solvent and the unreacted monomers, whereby the copolymer can be separated. Furthermore, since the amount of the catalyst is sufficient in a very small amount and the catalyst is generally a compound having a high boiling point, the copolymerization can be readily completed and in many cases it is only necessary to take removal of an aliphatic hydrocarbon having a low boiling point which is frequently used as a preferable solvent, for example, n-hexane, mainly into consideration, the solvent can be removed and at the same time, the dried copolymer can be obtained by adding to the polymerization solution an antioxidant, such as, phenyl-$\beta$-naphthylamine and if necessary, a small amount of an agent for deactivating the catalyst and then directly heating this solution, if necessary, under a reduced pressure. The catalyst is sufficient in a small amount, so that in many cases, even if such a catalyst remains in the copolymer, the physical property is not affected adversely at all. But when the catalyst residue should be decreased to a low level, such an object can be easily attained by contacting the reaction solution with a large amount of proper non-solvent efficiently, because the catalyst system itself is a homogeneous system, or treating with water containing a slight amount of acid, if necessary, because the multiyhdrocarbon radical-substituted pyridine of the second component is Brönsted base. Of course, in order to purify the copolymer, a precipitation process may be used.

The copolymer according to the present invention can be obtained as any composition of 1 to 99% by weight of conjugated diene and 99 to 1% by weight of vinyl-substituted aromatic hydrocarbon, but when the copolymer is to be used as rubber, a composition containing 70 to 95% by weight of conjugated diene (vinyl-substituted aromatic hydrocarbon being 5 to 30% by weight) is useful and when the copolymer is used as a resin, a copolymer containing 70 to 98% by weight of vinyl-substituted aromatic hydrocarbon (conjugated diene being 2 to 30% by weight) is preferable. Since the formation of random copolymer is due to the essential function of the novel catalyst of the present invention, the random copolymer can be easily obtained under the above described broad polymerization conditions. Furthermore, the ratio of vinyl structure in rubbery or resinous copolymer varies generally depending upon mole ratio of the second component/the first component and the copolymerization temperature. Accordingly, if necessary, the vinyl structure of butadiene unit, for example, in a copolymer of 1,3-butadiene and styrene may be obtained in an amount of 15 to 50% or more, but such a structure is generally within a range of 20 to 45%. In this case, in order to decrease the vinyl content, it is merely necessary to enhance the temperature or to reduce the mole ratio and in order to increase the content, it is merely necessary to make such procedures reverse. According to the copolymerization of the present invention, if the composition of both the monomers is adopted properly, a copolymer of rubbery solid having a high molecular weight and no gel can be easily obtained. The molecular weight is determined by a mole ratio of monomers to organolithium compound.

It has been recognized that in the copolymerization of, for example, butadiene and vinyl-substituted aromatic hydrocarbon, the glass transition temperature of the copolymer can be controlled by adjusting the composition of copolymer, the randomness of sequence distribution and the vinyl content of butadiene unit and the range is not particularly limited, but in the case of rubbery polymer, the range is −10 to −100° C.

The rubbery copolymer obtained by a proper composition of copolymer can be compounded by a conventional known means uitlized in the case of natural rubber and the like and the randomness of the copolymer is excellent in view of structure, so that the physical properties of the vulcanized product of the copolymer can be improved in various points as compared with that of the polybutadiene or the block copolymer obtained by organothium compound alone.

This copolymer can be used for production of tires of cars, gasket, container, sheet and the like.

Furthermore, the copolymer containing a high vinyl-substituted aromatic hydrocarbon can be used as resin and, for example, in a copolymer of 1,3-butadiene and styrene, a small amount of butadiene sequence is arranged randomly in the polystyrene sequence, so that impact strength is fairly improved.

In the following examples, all the starting materials to be used are expressed by weight part except the second catalyst component (hereinafter abridged as the second component). The amount of the second component used is expressed by mole ratio based on organolithium compound and, for example, expression "1.0" of the second component means that mole ratio of the second component based on organolithium compound is 1.0. Furthermore, the total amount of conjugated diene and vinyl-substituted aromatic hydrocarbon is 400 mmole in Examples 1 to 3 and 100 mmole in Examples 4 to 14 and comparative examples.

The invention will be further explained in detail by the following examples:

EXAMPLE 1

A pressure-proof bottle having a capacity of 250 ml. was thoroughly dried and purged with previously purified nitrogen three times repeatedly and then charged with 400 parts of dried n-hexane, 25 parts of styrene and a predetermined amount of the second component of the catalyst with an injector. The resulting mixture was cooled to −78° C. and fed with 75 parts of 1,3-butadiene and further 0.30 part (1.2 mmole) of n-butyllithium and then the pressure-proof vessel was capped. This bottle was placed and left to stand in a thermobath at 50° C. for 20 hours to effect polymerization and thereafter the polymerization reaction was inhibited by adding a large amount of 2% ethanol solution of phenyl-β-naphthylamine and the precipitated copolymer was separated and dried in vacuo at 50° C.

The conversion and the intrinsic viscosity at 30° C. in toluene, the styrene content, the microstructure of butadiene unit and the recovering percentage of the oxidative degradation of the resulting copolymer, are shown in the following Table 1. The intrinsic viscosities shown hereinafter were measured under the same condition and the unit is 100 ml./g.

From the Formula 2, the concentrations of trans-1,4 unit, vinyl unit and styrene can be easily calculated according to the thickness of cell $t$, the measured value of absorbance D and the above described extinction coefficient.

However, the concentration of cis-1,4 unit was calculated by reducing the concentrations of trans-1,4 unit, vinyl unit and styrene from the concentration of the sample.

The microstructure of 1,3-butadiene unit and styrene content described in the present invention are defined as follows:

$$\text{cis-1,4 content (weight \%)} = \frac{Cc}{Ct+Cv+Cc} \times 100$$

$$\text{trans-1, 4 content (weight \%)} = \frac{Ct}{Ct+Cv+Cc} \times 100$$

$$\text{vinyl content (weight \%)} = \frac{Cv}{Ct+Cv+Cc} \times 100$$

$$\text{styrene content (weight \%)} = \frac{Cst}{Ct+Cv+Cc+Cst} \times 100$$

$Ct$: concentration of trans-1,4 unit in the copolymer obtained by infrared spectrum analysis.
$Cv$: concentration of vinyl unit in the copolymer obtained by infrared spectrum analysis.
$Cc$: concentration of cis-1,4 unit in the copolymer obtained by infrared spectrum analysis.
$Cst$: concentration of styrene unit in the copolymer obtained by infrared spectrum analysis.

The measurement of infrared spectrum was made in a solution cell containing a cell thickness of 0.5 mm., in which the copolymer is dissolved in carbon disulfide. Furthermore, when using such an analyzing process, the theoretical styrene content in a conversion of 100% in various styrene feeding ratios meets favorably with the measured value.

With respect to the microstructure of polybutadiene, the quantitative analysis was made by using the exactly same measuring process.

TABLE 1

| Experiment No. | Second component Kind | Second component Amount | Conversion (percent) | Intrinsic viscosity | Styrene content (percent) | Microstructure of butadiene unit Cis-1,4 (percent) | Microstructure of butadiene unit Trans-1,4 (percent) | Microstructure of butadiene unit Vinyl (percent) | Recovering percentage of oxidative degradation (percent) |
|---|---|---|---|---|---|---|---|---|---|
| 1 | 2,4,6-collidine | 1.0 | 93.2 | 0.29 | 24.3 | 26.0 | 40.6 | 33.4 | <10 |
| 2 | β-collidine | 1.0 | 94.5 | 0.50 | 26.2 | 19.1 | 45.8 | 35.1 | 0 |

The microstructure of 1,3-butadiene unit and the styrene content of the copolymer were analyzed by using an infrared spectrometer following to the process described hereinafter.

In general, the intensity of infrared spectrum is shown by the following Formula 1 according to Beer's law.

$$I = I_0 e^{-kct} \quad (1)$$

$I$ = intensity of infrared ray passed through sample.
$I_0$ = intensity of infrared ray before passing through sample.
$k$ = extinction coefficient of sample.
$c$ = concentration of sample.
$t$ = thickness of cell.

With respect to the characteristic absorptions at 700 cm.$^{-1}$ assigned to styrene, 967 cm.$^{-1}$ assigned to trans-1,4 unit in butadiene unit and 910 cm.$^{-1}$ assigned to vinyl unit in butadiene unit, each extinction coefficient of a sample was calculated from standard material by using a Japanese spectrometer 402 G diffraction grating type of infrared spectrometer. The Formula 1 is deformed to obtain the following formula:

$$D = \log I_0/I = kct \quad (2)$$

The microstructure of the copolymer obtained in this example consisted of 20.1% of cis-1,4 content, 37.5% of trans-1,4 content, 42.4% of vinyl content and 23.7% of styrene content.

Furthermore, as a means for judging randomness of the copolymer obtained by the present invention, the randomness of styrene sequence was measured from a recovering percentage of styrene, which was recovered by an oxidative degradation method as mentioned hereinafter.

The oxidative degradation method was followed to I. M. Kolthoff process using osmium tetraoxide and tert-butyl hydroperoxide (described in Journal of Polymer Science, 1, 429 (1946)). Namely, when the polymer of the present invention is subjected to the oxidative degradation by means of a catalyst of osmium tetraoxide and tert-butyl hydroperoxide, only the butadiene unit is decomposed and the styrene unit is not decomposed and remains. When the thus treated copolymer is added with methanol, styrene sequence having a polymerization degree of less than about 5 may be soluble in methanol, while styrene sequence having a polymerization degree of more than about 5 may be insoluble in methanol. In this manner, the randomness of the copolymer can be judged from the recovering percentage of the methanol-insoluble sequence.

The term "recovering percentage" used herein means weight percentage of the styrene sequence recovered as the methanol-insoluble part through the oxidative degradation based on the total styrene content in the copolymer prior to the oxidative degradation.

A further explanation will be made with respect to the oxidative degradation in the results shown in Table 1.

The block copolymer obtained by copolymerizing 75 parts of 1,3-butadiene and 25 parts of styrene by means of n-butyllithium single component catalyst without adding the second component in a conversion of more than 90% showed generally a recovering percentage of oxidative degradation of about 80%. From this fact, it can be seen that both the copolymers in Experiment Nos. 1 and 2 are random copolymers. While, when using 2,4,6-collidine, the methanol insoluble part after subjected to the oxidative degradation does not precipitate after left to stand for a long period and even though the measurement was effected by means of centrifugal separation, it was impossible to obtain correct value. This fact shows that when using 2,4,6-collidine, even if the styrene sequence in the cooplymer may be more than 5, such a sequence is fairly short.

good. Additionally, it can be seen from the comparison of the recovering percentage of oxidative degradation with the vinyl content in Experiment Nos. 3, 4 and 5 that the randomness and the vinyl content in the copolymer can be controlled by varying the amount of the second component used. In the comparison of Experiment Nos. 6, 7 and 8, the same conclusion can be obtained with respect to the vinyl content.

EXAMPLE 3

The copolymerization of 1,3-butadiene and styrene was carried out in the same manner as described in Example 1 with a catalyst system using 2,4,6-collidine as the second component. The fed amounts were 400 parts of n-hexane, 25 parts of styrene, 1.0 of 2,4,6-collidine, 75 parts of 1,3-butadiene and predetermined amounts of n-butyllithium. The polymerization temperature was 50° C. or 75° C. and the polymerization time was 20 hours. The results are shown in the following Table 3.

TABLE 3

| Experiment No. | n-Butyl-lithium (part) | Second component | | Polymerization temperature (° C.) | Conversion (percent) | Intrinsic viscosity | Sytrene content (percent) | Microstructure of butadiene unit | | |
|---|---|---|---|---|---|---|---|---|---|---|
| | | Kind | Amount | | | | | Cis-1,4 (percent) | Trans-1,4 (percent) | Vinyl (percent) |
| 10 | 0.14 | 2,4,6-collidine | 1.0 | 50 | 99.3 | 0.52 | *— | — | — | — |
| 11 | 0.10 | do | 1.0 | 50 | 97.1 | 0.79 | 23.0 | 29.4 | 46.5 | 24.1 |
| 12 | 0.14 | do | 1.0 | 75 | 99.4 | 0.57 | — | — | — | — |
| 13 | 0.10 | do | 1.0 | 75 | 97.8 | 0.84 | 23.1 | 32.8 | 49.0 | 18.2 |

*In "—" of the table, the measurement was not made.

EXAMPLE 2

The copolymerization of 1,3-butadiene and styrene was carried out in the same manner as described in Example 1 with various catalyst systems in which various multi-alkyl radical-substituted pyridines and triethylamine for comparison were used as the second components, and the randomness was measured by the oxidative degradation method. The fed amounts were 400 parts of n-hexane, 21 parts of styrene, predetermined amounts of various multi-alkyl radical-substituted pyridines or triethylamine, 79 parts of 1,3-butadiene, and 0.15 part (0.6 mmole) of n-butyllithium. The polymerization temperature was 50° C. and the polymerization time was 20 hours.

The polymerization results are shown in the following Table 2.

From Table 3, it can be seen that when 2,4,6-collidine is used as the second component, the monomers can be polymerized quantitatively even by using a small amount, such as about 1/1,000 based on the total amount of fed monomers, of n-butyllithium of the first component. Furthermore, only a trace amount of polystyrene is recovered as a result of the oxidative degradation in Experiment No. 11.

EXAMPLE 4

A pressure-proof bottle having a capacity of 100 ml. was dried thoroughly, substituted with previously purified nitrogen three times repeatedly, and then fed with 400 parts of dried n-hexane, 25 parts of styrene and a predetermined amount of the second component by means of an injector, and the resulting mixture was cooled to −78° C., and fed with 75 parts of 1,3-butadiene and further 0.7 part (0.7 mmole) of n-butyllithium, and then the bottle was capped. The bottle was fixed in a thermobath provided with a rotating frame at 50° C.

TABLE 2

| Experiment No. | Second component | | Yield (percent) | Intrinsic viscosity | Styrene content (percent) | Microstructure of butadiene unit | | | Recovering percentage of oxidative degradation (percent) |
|---|---|---|---|---|---|---|---|---|---|
| | Kind | Amount | | | | Cis-1,4 (percent) | Trans-1,4 (percent) | Vinyl (percent) | |
| 3 | 2,4,6-collidine | 1.0 | >78.4 | 0.58 | 19.8 | 30.1 | 44.9 | 25.0 | (*) |
| 4 | do | 2.0 | 100.5 | 0.39 | 20.5 | 28.9 | 41.5 | 29.6 | Trace |
| 5 | do | 3.0 | 97.1 | 0.30 | 20.8 | 26.3 | 41.2 | 32.5 | 0 |
| 6 | β-Collidine | 1.0 | 93.8 | 0.95 | 20.0 | 24.0 | 41.5 | 34.5 | 0 |
| 7 | do | 2.0 | 86.0 | 0.58 | 20.2 | 25.5 | 36.4 | 38.1 | 0 |
| 8 | do | 3.0 | 32.0 | 0.35 | 18.8 | 22.6 | 31.6 | 45.8 | 0 |
| 9 | Triethylamine | 2.0 | 98.6 | 0.90 | 19.3 | 38.7 | 49.7 | 11.6 | 82.6 |

*Insoluble part in methanol does not precipitate even after left to stand for a few days. This fact indicates that the recovered polystyrene chain is fairly short.

When triethylamine is used in an amount of 2.0 as the second component, the recovering percentage in the obtained polymer is 82.6% as a result of an oxidative degradation. On the contrary, when β-collidine is used in an amount of 1.0–3.0, the recovering percentage is 0, and the randomness is excellent. Furthermore, when 2,4,6-collidine is used in an amount of 2.0, the recovering percentage is a trace and also the randomness is fairly After carried out a rotation polymerization for a predetermined period of time, the polymerization reaction was inhibited with a large amount of 2% ethanol solution of phenyl-β-naphthylamine, and then the precipitated copolymer was taken out and dried in vacuo at 50° C. The conversion to the copolymer, the vinyl content of butadiene unit and the styrene content are shown in the following Table 4.

TABLE 4

| Experiment No. | Second component | | Polymerization time (minute) | Conversion (percent) | Styrene content (percent) | Vinyl content of butadiene unit (percent) |
| --- | --- | --- | --- | --- | --- | --- |
| | Kind | Amount | | | | |
| 14 | 2,4,6-collidine | 0.5 | 20 | 69.4 | 13.4 | 35.5 |
| 15 | 2,3,6-collidine | 0.5 | 20 | 61.8 | 11.1 | 30.8 |
| 16 | Triethylamine | 0.5 | 20 | 29.9 | 4.0 | 12.2 |
| 17 | 2,4,6-collidine | 1.5 | 20 | 81.6 | 15.4 | 40.3 |
| 18 | 2,3,6-collidine | 1.5 | 15 | 62.1 | 12.3 | 27.9 |
| 19 | Triethylamine | 1.5 | 20 | 43.7 | 5.5 | 15.8 |
| 20* | N,N-diethylaniline | 1.5 | 60 | 25.8 | 3.0 | 13.2 |

*This experiment was carried out at 40° C.

From Table 4, it can be seen that when 2,4,6-collidine or 2,3,6-collidine is used as the second component, the polymeriaztion rate is fairly higher than that in the case of triethylamine or N,N-diethylaniline. Of course, the styrene content of the copolymer is extremely higher.

EXAMPLE 5

According to the same manner as described in Example 4, the copolymerization of 1,3-butadiene and styrene was carried out with a catalyst system using 2,4,6-collidine, 2,3,6-collidine, β-collidine or triethylamine as the second component. The fed amounts were 400 parts of n-hexane, 25 parts of styrene, a predetermined amount of each second component, 75 parts of 1,3-butadiene and 0.7 part of n-butyllithium, and the polymerization temperature was 50° C. The results are shown in the following Table 5.

TABLE 5

| Experiment No. | Second component | | Polymerization time (minute) | Conversion (percent) | Styrene content (percent) | Vinyl content of butadiene unit (percent) |
| --- | --- | --- | --- | --- | --- | --- |
| | Kind | Amount | | | | |
| 21 | 2,4,6-collidine | 0.5 | 20 | 69.4 | 13.4 | 35.5 |
| 22 | 2,3,6-collidine | 0.5 | 20 | 61.8 | 11.1 | 30.8 |
| 23 | β-Collidine | 0.5 | 60 | 72.4 | 19.1 | 27.3 |
| 24 | Triethylamine | 0.5 | 60 | 61.5 | 5.5 | 12.5 |
| 25 | 2,4,6-collidine | 1.5 | 10 | 67.3 | 13.8 | 42.8 |
| 26 | 2,3,6-collidine | 1.5 | 15 | 65.1 | 15.7 | 37.6 |
| 27 | β-Collidine | 1.5 | 60 | 60.8 | 20.8 | 38.6 |
| 28 | Triethylamine | 1.5 | 60 | 68.6 | 7.2 | 16.0 |

By comparing the styrene content at the substantially same conversion with respect to the four second components in Table 5, it can be seen that the copolymers obtained by the three collidines contain an extremely higher styrene and have more excellent randomness than triethylamine. In the case of β-collidine, the styrene content is especially high.

EXAMPLE 6

The copolymerization of 1,3-butadiene and styrene was carried out in the same manner as described in Example 4 with a catalyst system using β-collidine as the second component. The fed amounts were 400 parts of n-hexane, 25 parts of styrene, 1.5 of β-collidine, 75 parts of 1,3-butadiene and 0.7 part of n-butyllithium, and the polymerization temperature was 50° C. The results are shown in the following Table 6.

TABLE 6

| Experiment No. | Amount of second component | Polymerization time (minute) | Conversion (percent) | Styrene content (percent) | Vinyl content of butadiene unit (percent) |
| --- | --- | --- | --- | --- | --- |
| 29 | 1.5 | 10 | 7.5 | 23.1 | 37.6 |
| 30 | 1.5 | 60 | 61.0 | 23.2 | 38.6 |
| 31 | 1.5 | 120 | 89.3 | 23.0 | 39.2 |

From Table 6, it can be seen that by using β-collidine of 1.5 equivalent based on n-butyllithium under the above described condition, the copolymers wherein the distribution ratio of styrene is uniform throughout the molecular chain of the copolymer and meets with the fed ratio, can be obtained.

EXAMPLE 7

The copolymerization of 1,3-butadiene and styrene was carried out in the same manner as described in Example 4 with a catalyst system using pentamethylpyridine as the second component. The fed amounts were 400 parts of n-hexane, 25 parts of styrene, a predetermined amount of pentamethylpyridine, 75 parts of 1,3-butadiene and a predetermined amount of n-butyllithium. The results are shown in the following Table 7.

TABLE 7

| Experiment No. | Amount of n-butyllithium used (part) | Amount of second component used | Polymerization temperature (° C.) | Polymerization time (minute) | Conversion (percent) | Styrene content (percent) | Vinyl content of butadiene unit (percent) |
| --- | --- | --- | --- | --- | --- | --- | --- |
| 32 | 0.7 | 1.5 | 40 | 40 | 77 | 17.2 | 51.4 |
| 33 | 0.5 | 1.0 | 50 | 30 | 76 | 17.4 | 44.5 |

From the conversion and the styrene content shown in Table 7, it can be seen that the activating effect and the randomizing effect are high even by using pentamethylpyridine.

EXAMPLE 8

The copolymerization of 1,3-butadiene and styrene was carried out in the same manner as described in Example 4 with various catalyst systems using six lutidines and aldehydecollidine as the second component. The fed amounts were 400 parts of n-hexane, 25 parts of styrene, a predetermined amount of each second component, 75 parts of 1,3-butadiene and 0.3 part of n-butyllithium. The results are shown in the following Table 8.

then the after-treatment was effected according to the manner as described in Example 4. The conversion to the copolymer was 16.3%, the styrene content was 19.2%,

TABLE 8

| Experiment No. | Second component | | Polymerization temperature (°C.) | Polymerization time (minute) | Conversion (percent) | Styrene content (percent) | Vinyl content of butadiene unit (percent) |
|---|---|---|---|---|---|---|---|
| | Kind | Amount | | | | | |
| 34 | 3,4-lutidine | 0.8 | 50 | 37 | 33.2 | 19.5 | 34.0 |
| 35 | do | 1.5 | 50 | 37 | 23.4 | 21.7 | 40.2 |
| 36 | do | 3.0 | 50 | 37 | 10.5 | 25.0 | 48.6 |
| 37 | do | 1.0 | 75 | 7 | 33.4 | 18.4 | 33.2 |
| 38 | do | 1.5 | 75 | 7 | 23.4 | 20.3 | 37.5 |
| 39 | do | 3.0 | 75 | 7 | 6.8 | 21.3 | 43.1 |
| 40 | 3,5-lutidine | 0.8 | 50 | 37 | 10.8 | 16.1 | 28.9 |
| 41 | do | 1.5 | 50 | 37 | 4.9 | 24.1 | 37.5 |
| 42 | do | 1.0 | 75 | 7 | 4.6 | 17.0 | 30.0 |
| 43 | do | 1.5 | 75 | 7 | 2.9 | 19.7 | 32.9 |
| 44 | 2,3-lutidine | 0.8 | 50 | 37 | 14.6 | 11.3 | 29.3 |
| 45 | do | 3.0 | 75 | 7 | 14.7 | 11.9 | 27.6 |
| 46 | 2,4-lutidine | 0.8 | 50 | 31 | 14.1 | 11.3 | 26.5 |
| 47 | do | 1.5 | 75 | 7 | 16.7 | 11.6 | 26.9 |
| 48 | 2,5-lutidine | 0.8 | 50 | 37 | 7.4 | 11.2 | 23.5 |
| 49 | do | 1.5 | 75 | 7 | 5.7 | 12.9 | 26.9 |
| 50 | 2,6-lutidine | 3.0 | 50 | 37 | 12.7 | 11.7 | 43.7 |
| 51 | do | 3.0 | 75 | 7 | 19.6 | 11.0 | 34.0 |
| 52 | Aldehydecollidine | 1.5 | 50 | 37 | 7.1 | 15.1 | 30.3 |
| 53 | do | 1.5 | 75 | 7 | 6.5 | 12.3 | 27.1 |

This example aims to indicate that even when using each of six lutidines or aldehydecollidine, a considerable amount of styrene is present in the copolymer chain at an initial polymerization period, and this fact is apparently shown in Table 8. From Table 8, it can also be seen that the randomizing effect due to 3,4-lutidine and 3,5-lutidine is particularly high.

EXAMPLE 9

The copolymerization of 1,3-butadiene and styrene was carried out in the same manner as described in Example 4 with a catalyst system using a lutidine-collidine mixture (boiling range: 145–175° C.) as the second component. The fed amounts were 400 parts of n-hexane, 25 parts of styrene, 1.0 of the second component, 75 parts of 1,3-butadiene and 0.3 part of n- butyllithium. After the rotation polymerization was carried out in a thermobath at 50° C. for 15 minutes, the after-treatment was effected according to the manner as described in Example 4. The conversion to the copolymer was 12.4%, the styrene content was 11.1%, and the microstructure of butadiene unit consisted of cis-1,4 of 31.8%, trans-1,4 of 37.2% and vinyl of 31.0%. On the contrary, the conversion of the copolymer obtained under the above described condition except that the second component was not used, was 12.2% and the styrene content was 2.2%. It is apparent that even when using the lutidine-collidine mixture, a considerable amount of styrene is already contained in the copolymer at an initial polymerization period as in the case of Example 8.

EXAMPLE 10

The copolymerization of 1,3-butadiene and styrene was carried out in the same manner as described in Example 4 with a catalyst system using β-collidine as the second component. The fed amounts were 400 parts of n-hexane, 25 parts of styrene, 2.0 of the second component, 75 parts of 1,3-butadiene and 0.2 part of n-butyllithium. After the resulting mixture was left to stand in a thermobath at 75° C. for 15 minutes to effect polymerization and then the after-treatment was effected according to the manner as described in Example 4. The conversion to the copolymer was 16.3%, the styrene content was 19.2%, and the microstructure of butadiene unit consisted of cis-1,4 of 24.2%, trans-1,4 of 37.6% and vinyl of 38.1%. On the other hand, the conversion of the copolymer, obtained under the same condition as described above, except that the second component was not used, was 11.1% and the styrene content was 1.9%. It can be seen that the copolymer having a fairly good randomness is obtained even at 75° C. when using β-collidine.

EXAMPLE 11

This example aimed to check an influence of aging upon a catalyst system.

A pressure-proof bottle having a capacity of 100 ml. was dried thoroughly, substituted with previously purified nitrogen three times repeatedly, and then fed with 400 parts of dried n-hexane, 1.0 of 2,3,6-trimethyl pyridine and 0.7 part of n-butyllithium in the order as described above, and the resulting mixture was aged at a predetermined temperature for 30 minutes, and then 75 parts of 1,3-butadiene and 25 parts of styrene were rapidly added thereto and the rotation polymerization was carried out at 40° C. for 1 hour. The after-treatment after the completion of the polymerization was effected according to the manner as described in Example 4. The results are shown in the following Table 9.

TABLE 9

| Experiment No. | Aging temperature (°C.) | Conversion (percent) | Styrene content (percent) | Microstructure of butadiene unit | | |
|---|---|---|---|---|---|---|
| | | | | Cis-1,4 (percent) | Trans-1,4 (percent) | Vinyl (percent) |
| 56 | −78 | 52.4 | 12.4 | 27.7 | 32.1 | 40.2 |
| 57 | 25 | 39.0 | 11.0 | 26.2 | 34.1 | 40.0 |
| 58 | 50 | 49.5 | 11.2 | 21.9 | 36.8 | 41.3 |
| 59* | | 65.0 | 12.6 | 24.7 | 33.5 | 41.7 |
| 60** | | 22.4 | 3.5 | 37.2 | 52.9 | 9.9 |

*In this polymerization, the aging was not effected and n-butyllithium was added finally.
**2,3,6-collidine was not used.

It can be seen from Table 9 that under the mild conditions as shown in this example, the activity and the randomness are not considerably influenced by whether the aging is effected or not or by the condition thereof.

Comparative examples

By using pyridine or quinoline as the second component the copolymerization of 1,3-butadiene and styrene was carried out in the same manner as described in Example 4. The fed amounts were 400 parts of n-hexane, 25 parts of styrene, a predetermined amount of the second component, 75 parts of 1,3-butadiene and 0.7 part of n-butyllithium. The results of the polymerization are shown in the following Table 10.

TABLE 10

| Experiment No. | Amount of n-butyllithium used (part) | Second component Kind | Second component Amount | Polymerization temperature (° C.) | Polymerization time (minute) | Conversion (percent) | Styrene content (percent) |
|---|---|---|---|---|---|---|---|
| 61 | 0.3 | Pyridine | 0.3 | 50 | 37 | 29.8 | 4.1 |
| 62 | 0.3 | do | 0.8 | 50 | 37 | 0 | |
| 63 | 0.3 | do | 3.0 | 50 | 37 | 0 | |
| 64 | 0.3 | do | 0.5 | 75 | 17 | 5.6 | 4.3 |
| 65 | 0.3 | do | 1.0 | 75 | 17 | 0 | |
| 66 | 0.3 | do | 3.0 | 75 | 17 | 0 | |
| 67 | 0.7 | do | 0.7 | 40 | 60 | 0 | |
| 68 | 0.7 | do | 1.0 | 50 | 200 | 0 | |
| 69 | 0.7 | do | 1.5 | 50 | 900 | 0 | |
| 70 | 0.7 | Quinoline | 1.0 | 50 | 60 | 0 | |
| 71 | 0.7 | do | 1.5 | 40 | 60 | 0 | |

It is indicated in Table 10 that pyridine or quinoline provents completely the polymerization in the use of equivalent to n-butyllithium. Furthermore, it can be seen from Table 10 that although the polymerization proceeds in an amount of less than 0.5 equivalent, such a compound has substantially no effect for forming random copolymer.

EXAMPLE 12

A mixture of isoprene and styrene in the same amount was polymerized in the same manner as described in Example 4 with a catalyst system using β-collidine as the second component.

A pressure-proof bottle having a capacity of 100 ml. was dried thoroughly, and its interior was substituted with purified nitrogen, and charged with 400 parts of dried n-hexane, 100 parts of the mixture of isoprene and styrene in the same amount, and 1.0 of the second component by means of an injector and finally added with 0.3 mmole of n-butyllithium and the bottle was capped. The bottle was fixed in a thermobath provided with a rotating frame at 50° C., the rotation polymerization was carried out for 120 minutes, and then the after-treatment was effected according to the manner as described in Example 4. The yield of the copolymer was 83.0% and the recovering percentage of the oxidative degradation was 0%.

EXAMPLE 13

The copolymerization of 1,3-butadiene and styrene was carried out by using phenyllithium or dilithiostilbene in place of n-butyllithium as the organolithium compound and β-collidine as the second component.

A pressure-proof bottle having a capacity of 100 ml. was dried thoroughly, and its interior was substituted with purified nitrogen, and fed with 400 parts of dried n-hexane, 25 parts of styrene, and a predetermined amount of the second component by means of an injector. The resulting mixture was cooled to −78° C., and added with 75 parts of 1,3-butadiene and further 0.3 mmole of the organolithium compound. Then the bottle was capped. The bottle was placed in a thermobath provided with a rotating frame at 50° C. to effect the polymerization for about 120 minutes.

The results of the polymerization are shown in the following Table 11.

TABLE 11

| Experiment No. | Organolithium compound | Amount of second component | Conversion (percent) | Styrene content (percent) | Microstructure of butadiene unit Trans-1,4 (percent) | Vinyl (percent) | Cis-1,4 (percent) | Recovering percentage of oxidative degradation (percent) |
|---|---|---|---|---|---|---|---|---|
| 62 | Phenyllithium | 0.0 | 58.2 | 3.9 | 50.3 | 9.4 | 40.3 | 35 |
| 63 | do | 1.0 | 72.0 | 20.1 | 36.6 | 38.1 | 25.3 | 0 |
| 64 | Dilithiostilbene | 0.0 | 61.9 | 4.8 | 52.8 | 9.0 | 38.2 | 50 |
| 65 | do | 1.0 | 70.5 | 19.8 | 35.2 | 40.2 | 24.6 | 0 |

NOTE.—Experiment Nos. 62 and 64 are comparative examples.

EXAMPLE 14

This example shows an influence of a solvent upon the polymerization.

A previously dried pressure-proof bottle (capacity: 100 ml.) was substituted with purified nitrogen and then fed with 400 parts of various solvents, 25 parts of styrene and 1.0 of 3,4-lutidine as the second component by means of an injector, the resulting mixture was cooled to −78° C. and added with 75 parts of 1,3-butadiene and further 0.3 part (0.3 mmole) of n-butyllithium. Then the bottle was capped. The bottle was placed in thermobath provided with a rotating frame at 50° C. to effect the polymerization for about 30 minutes.

The results of the polymerization are shown in the following Table 12.

TABLE 12

| Experiment No. | Solvent | Polymerization time (minute) | Conversion (percent) | Styrene content (percent) | Vinyl content (percent) | Recovering percentage of oxidative degradation (percent) |
|---|---|---|---|---|---|---|
| 66 | n-Hexane | 120 | 94.2 | 25.1 | 41.9 | 0 |
| 67 | Cyclohexane | 45 | 96.3 | 23.8 | 45.2 | 0 |
| 68 | Toluene | 30 | 98.2 | 24.1 | 51.4 | 0 |

EXAMPLE 15

An autoclave having a capacity of 25 l. provided with a mechanical stirrer, a monomer supplying tank and a thermoregulator, was dried thoroughly, substituted with previously purified nitrogen repeatedly to form a completely inert gaseous atmosphere.

400 parts of dried n-hexane, 25 parts of styrene dried with silica gel and 0.5 of β-collidine were fed into the autoclave. The resulting mixture was cooled to 5° C. and fed with 75 parts of 1,3-butadiene and then 0.08 part (31 mmole) of n-butyllithium under stirring, and the temperature of the polymerization system was adjusted to 60° C. to start the polymerization. After continuing the polymerization for 9 hours, the polymerization reaction was inhibited with an acetone solution of 2,6-di-tert-butyl-p-cresol.

The removal of solvent was carried out in a conventional steam strip procedure, and thereafter the resulting copolymer was dried in vacuo at 50° C. The thus obtained copolymer was a transparent rubbery elastomer containing no gel with a yield of 90%, the intrinsic viscosity [η] was 2.02 and the Mooney viscosity (ML–4) at 100° C. was 62.0. Furthermore, the styrene content of the copolymer was 20.9%, the microstructure of the butadiene unit consisted of trans-1,4 of 44.9%, cis-1,4 of 28.6% and vinyl of 26.5%, and the recovering percentage of the oxidative degradation was 0%.

EXAMPLE 16

The purpose of this example is to compare butadiene-styrene copolymers synthesized in various manners.

An elastomer A is a commercially available SBR having a medium vinyl content (about 30%), which is prepared by a solution polymerization. An elastomer B is the copolymer obtained in Example 15.

The following table shows structural characteristics of said two elastomers.

|  | Copolymer | |
| --- | --- | --- |
|  | A | B |
| Structural characteristic: |  |  |
| Styrene content (percent) | 25.8 | 20.9 |
| Trans-1,4 (percent) | 43.5 | 44.9 |
| Cis-1,4 (percent) | 23.6 | 28.6 |
| Vinyl (percent) | 32.9 | 26.5 |
| Recovering percentage of oxidative degradation (percent) | 0 |  |
| [η] | 1.92 | 2.02 |
| ML-4 (100° C.) | 57.8 | 62.0 |
| Glass transition temperature Tg (° C.) | −56 | −64 |

Copolymers A and B were blended according to the following recipe:

|  | Parts |
| --- | --- |
| Copolymer | 100 |
| Carbon black (ISAF) | 60 |
| Aromatic oil | 20 |
| Zinc oxide | 5 |
| Stearic acid | 2 |
| Vulcanizing accelerator [1] | 1.2 |
| Sulfur | 1.75 |

[1] N-hydroxydiethylene-2-benzothiazole sulfenamide.

The characteristics of the vulcanized rubber are as follows:

|  | A' | B' |
| --- | --- | --- |
| Elongation (percent) | 517 | 561 |
| Tensile strength (kg./cm.²) | 201 | 207 |
| 300% modulus (kg./cm.²) | 96 | 85 |
| Resilience (percent) | 51 | 48 |
| Hardness (microhardness) | 69 | 68 |

From the above data it can be seen that the compound (B') including the copolymer (B) of the present invention is higher than the comparative sample in elongation.

What is claimed is:

1. A process for copolymerizing two monomeric materials of (1) a conjugated diene containing from 4 to 12 carbon atoms and (2) a vinyl-substituted aromatic hydrocarbon to form a copolymer comprising:
contacting said monomeric materials at a temperature in the range of −80 to 150° C.
with a reaction medium consisting of a substantially anhydrous liquid hydrocarbon having less than 20 carbon atoms and
a catalyst consisting of (1) an organolithium compound having the formula $R^1(Li)_x$, wherein $R^1$ is selected from the group consisting of aliphatic, cycloaliphatic and aromatic hydrocarbon radicals containing from 1 to 40 carbon atoms, and $x$ is an integer from 1 to 4, and (2) a pyridine compound having the formula

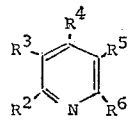

wherein $R^2$, $R^3$, $R^4$, $R^5$ and $R^6$ are selected from the group consisting of hydrogen and alkyl groups having 1 to 5 carbon atoms with the proviso at least two of them are said alkyl groups, the amount of organolithium compound being in the range of 0.01 to 100 mmoles per mole of said monomeric mixture and the mole ratio of said pyridine compound to said organolithium compound being in the range of 0.5 to 10.0.

2. A process according to claim 1, wherein said conjugated diene is 1,3-butadiene and said vinyl-substituted aromatic hydrocarbon is styrene.

3. A process according to claim 1, wherein said conjugated diene is isoprene and said vinyl-substituted aromatic hydrocarbon is styrene.

4. A process according to claim 1, wherein said pyridine compound is 3,4-lutidine.

5. A process according to claim 1, wherein said pyridine compound is 3,5-lutidine.

6. A process according to claim 1, wherein said pyridine compound is 2,3-lutidine.

7. A process according to claim 1, wherein said pyridine compound is 2,4-lutidine.

8. A process according to claim 1, wherein said pyridine compound is 2,5-lutidine.

9. A process according to claim 1, wherein said pyridine compound is 2,6-lutidine.

10. A process according to claim 1, wherein said pyridine compound is β-collidine.

11. A process according to claim 1, wherein said pyridine compound is 2,4,6-collidine.

12. A process according to claim 1, wherein said pyridine compound is 2,3,6-collidine.

13. A process according to claim 1, wherein said pyridine compound is pentamethylpyridine.

14. A process according to claim 1, wherein said pyridine compound is aldehydecollidine.

15. A process according to claim 1, wherein said organolithium compound is n-butyllithium.

16. A process according to claim 1, wherein the copolymer prepared is a copolymer of 1,3-butadiene and styrene.

17. A process for preparing completely random, high molecular weight, rubbery copolymers of 1,3-butadiene and styrene, said styrene constituting between 5 and 30 weight percent of said copolymer, which comprises contacting said monomeric materials at a temperature in range of 0 to 100° C. with a reaction medium consisting of substantially anhydrous liquid hydrocarbon having 4 to 10 carbon atoms and a catalyst consisting of (1) n-butyllithium and (2) a pyridine compound selected from the group consisting of 3,4-lutidine, β-collidine, 2,4,6-collidine and 2,3,6-collidine, the amount of said organolithium compound being in the range of 0.01 to 10 mmoles per mole of said monomeric materials and the mole ratio of said pyridine compound to said organolithium compound being in the range of 0.7 to 5.0.

References Cited

UNITED STATES PATENTS

| 2,975,160 | 3/1961 | Zelinski | 260—83.7 |
| 3,402,162 | 9/1968 | Strobel | 260—83.7 |
| 3,451,988 | 6/1969 | Langer | 260—84.7 |

JAMES A. SEIDLECK, Primary Examiner

U.S. Cl. X.R.

252—431; 260—94.6